US006945675B2

(12) United States Patent
Jongewaard et al.

(10) Patent No.: US 6,945,675 B2
(45) Date of Patent: Sep. 20, 2005

(54) FASCIA WASH LUMINAIRE

(75) Inventors: Mark Paul Jongewaard, Arvada, CO (US); Donald M. Perreira, Oakland, CA (US)

(73) Assignee: Genlyte Thomas Group LLC, Louisville, KY (US)

( * ) Notice: Subject to any disclaimer, the term of this patent is extended or adjusted under 35 U.S.C. 154(b) by 57 days.

(21) Appl. No.: 10/336,192

(22) Filed: Jan. 3, 2003

(65) Prior Publication Data

US 2003/0128632 A1 Jul. 10, 2003

Related U.S. Application Data

(60) Provisional application No. 60/345,070, filed on Jan. 4, 2002.

(51) Int. Cl.[7] .................................................. B60Q 1/06

(52) U.S. Cl. ....................... 362/371; 362/147; 362/221; 362/282; 362/309; 362/328

(58) Field of Search ................................ 362/371, 269, 362/277, 147, 221, 282, 287, 427, 308, 309, 299, 328, 329, 334

(56) References Cited

U.S. PATENT DOCUMENTS

| | | | | | |
|---|---|---|---|---|---|
| 1,900,436 | A | | 3/1933 | Dourgnon | |
| 1,969,714 | A | | 8/1934 | Burger | |
| 3,679,889 | A | | 7/1972 | Franck | |
| 4,164,010 | A | | 8/1979 | Finch | |
| 4,188,657 | A | * | 2/1980 | Reibling | 362/348 |
| 4,360,863 | A | * | 11/1982 | Barnes et al. | 362/346 |
| 4,451,875 | A | | 5/1984 | Odle et al. | |
| 4,559,587 | A | | 12/1985 | Quiogue | |
| 4,564,888 | A | | 1/1986 | Lewin et al. | |
| 4,569,003 | A | * | 2/1986 | Elmer et al. | 362/147 |
| 4,731,714 | A | | 3/1988 | Kelly et al. | |
| 4,858,091 | A | | 8/1989 | Fouke | |
| 4,862,333 | A | | 8/1989 | Brasket | |
| 4,881,156 | A | | 11/1989 | Shemitz et al. | |
| 4,894,758 | A | | 1/1990 | O'Toole | |
| 4,937,718 | A | * | 6/1990 | Murray | 362/431 |
| 5,051,878 | A | * | 9/1991 | Ngai | 362/299 |
| 5,158,348 | A | | 10/1992 | Sakamoto et al. | |
| 5,307,254 | A | | 4/1994 | Russello et al. | |
| 5,379,199 | A | | 1/1995 | Hirshenhorn et al. | |
| D364,242 | S | | 11/1995 | Fiorato | |
| 5,546,292 | A | | 8/1996 | Shemitz | |
| 5,613,766 | A | * | 3/1997 | Raouf | 362/287 |
| 5,997,156 | A | | 12/1999 | Perlo et al. | |
| 6,027,231 | A | * | 2/2000 | Fouke | 362/309 |

* cited by examiner

*Primary Examiner*—Sandra O'Shea
*Assistant Examiner*—Mark Tsidulko
(74) *Attorney, Agent, or Firm*—Middleton Reutlinger

(57) ABSTRACT

A fascia wash luminaire has a housing, a lamp socket and a refractor lens. The lamp socket mounts within the housing and is designed to hold a lamp in place within the housing. The refractor lens is trough shaped and is also held by the housing positioned under the light generation region for focusing the light from the light generation region to the fascia more broadly beneath the luminaire and more narrowly to the sides of the luminaire. The lens is shaped such that the distance between the lens and light generation region is smaller directly under the light generation region than it is on either side of the light generation region. The luminaire may also have a reflector for boosting the light directed downward and diagonal to the luminaire.

24 Claims, 11 Drawing Sheets

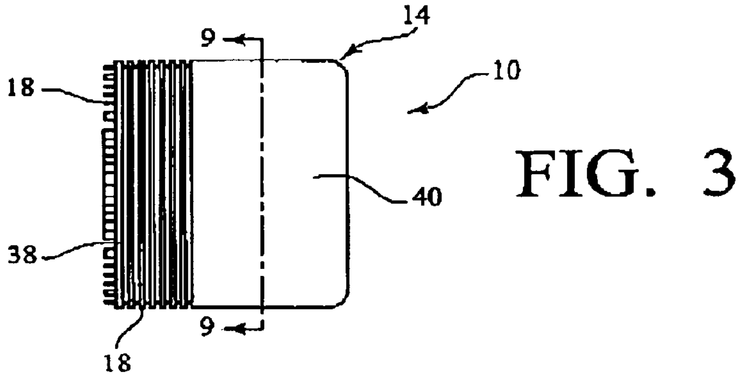
FIG. 3
FIG. 4
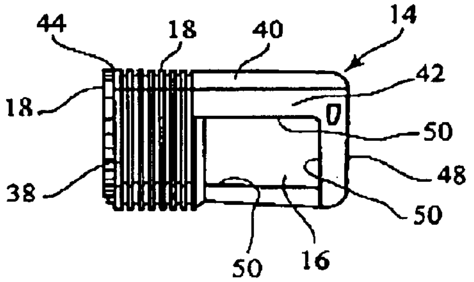
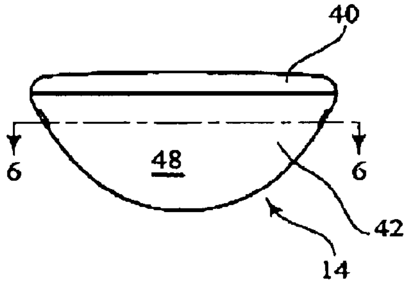
FIG. 5

FASCIA WASH LUMINAIRE

CROSS-REFERENCE TO RELATED APPLICATIONS

This application claims the benefit of U.S. Provisional Application No. 60/345,070, filed Jan. 4, 2002.

STATEMENT REGARDING FEDERALLY SPONSORED RESEARCH OR DEVELOPMENT

Not applicable.

REFERENCE TO A "SEQUENTIAL LISTING," A TABLE, OR A COMPUTER PROGRAM LISTING APPENDIX SUBMITTED ON A COMPACT DISC

Not applicable.

BACKGROUND OF THE INVENTION

1. Field of the Invention

This invention relates to light fixtures, or luminaires, and more particularly to a fascia wash luminaire which mounts directly to a wall and which has an optical system designed to uniformly light a large portion of the wall.

2. Description of Prior Art

Light designers, building owners, and retail store managers are a few of the persons that have indicated the desire for building fascia illumination. For example, retailers desire the store fronts of their buildings to be well lighted to draw in customers after dark. This is typically been accomplished by the use of flood lighting from light fixtures which are mounted on the ground or on poles in front of the building. Besides being unsightly, these large fixtures tend to blast light in the face of customers and other building occupants as they leave the store. Additionally, there are frequently no good options for the placement of remote flood lights. Thus, a luminaire is desired that mounts directly to a wall to be illuminated that has an optical system which is designed to light the wall. Further, since building fronts are usually vast surfaces, multiple luminaires will typically be required to light the surface. Therefore, it is also desired that such a luminaire be able to focus its illumination pattern such that multiple luminaires placed across the top or bottom of a wall will cooperate to evenly illuminate the wall.

BRIEF SUMMARY OF THE INVENTION

Thus, it is an object of the present invention to provide a fascia wash luminaire.

It is a further object of the invention to provide a luminaire that mounts directly to a wall to be illuminated having an optical system to light the wall.

It is even a further object of the invention to provide a fascia wash luminaire which may be mounted in multiple numbers across the top of a wall, with each luminaire producing a light pattern primarily beneath the luminaire and slightly to the sides of the luminaire in a substantially rectangular pattern.

These and other objects are achieved by a fascia wash luminaire having a housing, a lamp socket, and a refractor lens. The housing is designed for mounting to a wall along the top of the wall, but may also be mounted on the bottom of the wall with the same optical effect. The lamp socket mounts within the housing and is designed to hold a lamp in place within the housing. The refractor lens is trough shaped and is also held by the housing positioned under the light generation region for focusing the light from the light generation region to the wall more broadly beneath the luminaire and more narrowly to the sides of the luminaire. The lens is shaped such that the distance between the lens and light generation region is smaller directly under the light generation region than it is on either side of the light generation region.

The light generation region of the lamp may be linearly shaped and positioned substantially normal to the wall by the lamp socket.

The trough shaped refractor lens may have a Fresnel prismatic lens profile. Additionally, the trough shaped refractor lens may taper from its distal end to the end approximate to the wall.

Further, the fascia wash luminaire may also have a trough shaped reflector positioned over the linear light generation region opposed to the trough shaped refractor lens. The reflector may thus reflect light collected form the top side of the light generation region through the refractor lens predominately beneath the luminaire and partially diagonal to the luminaire.

BRIEF DESCRIPTION OF THE SEVERAL VIEWS OF THE DRAWING

FIG. 3 is a top view of a fascia wash luminaire of the present invention.

FIG. 4 is a side view of a fascia wash luminaire of the present invention.

FIG. 5 is a front view of a fascia wash luminaire of the present invention.

DETAILED DESCRIPTION OF THE INVENTION

Figure 1:
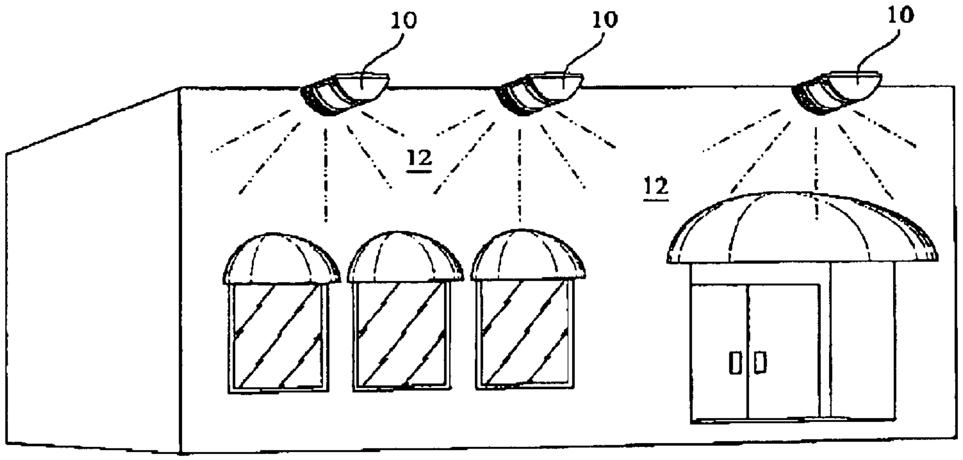
FIG. 1 is an illustration of a building fascia having fascia wash luminaires of the present invention.

As shown in FIG. 1, the fascia wash luminaire 10 of the present invention is designed for mounting along the top edge of the building fascia or wall 12. Since the fascia of the building is usually a vast area, multiple luminaires will usually be used to evenly illuminate the fascia. Thus, each luminaire 10 is designed to focus its light output in a substantially rectangular area beneath the luminaire, such that multiple luminaires may cooperate together to evenly illuminate the wall or fascia 12.

This discussion will proceed with the presumption that the luminaire of the invention will be mounted along the top edge of a fascia or wall 12, however one of skill in the art will recognize that the principles taught and claimed herein apply equally to positioning of the luminaire 10 along the bottom edge of a wall 12 such that the illumination pattern projects upward on the wall 12.

Figure 2:
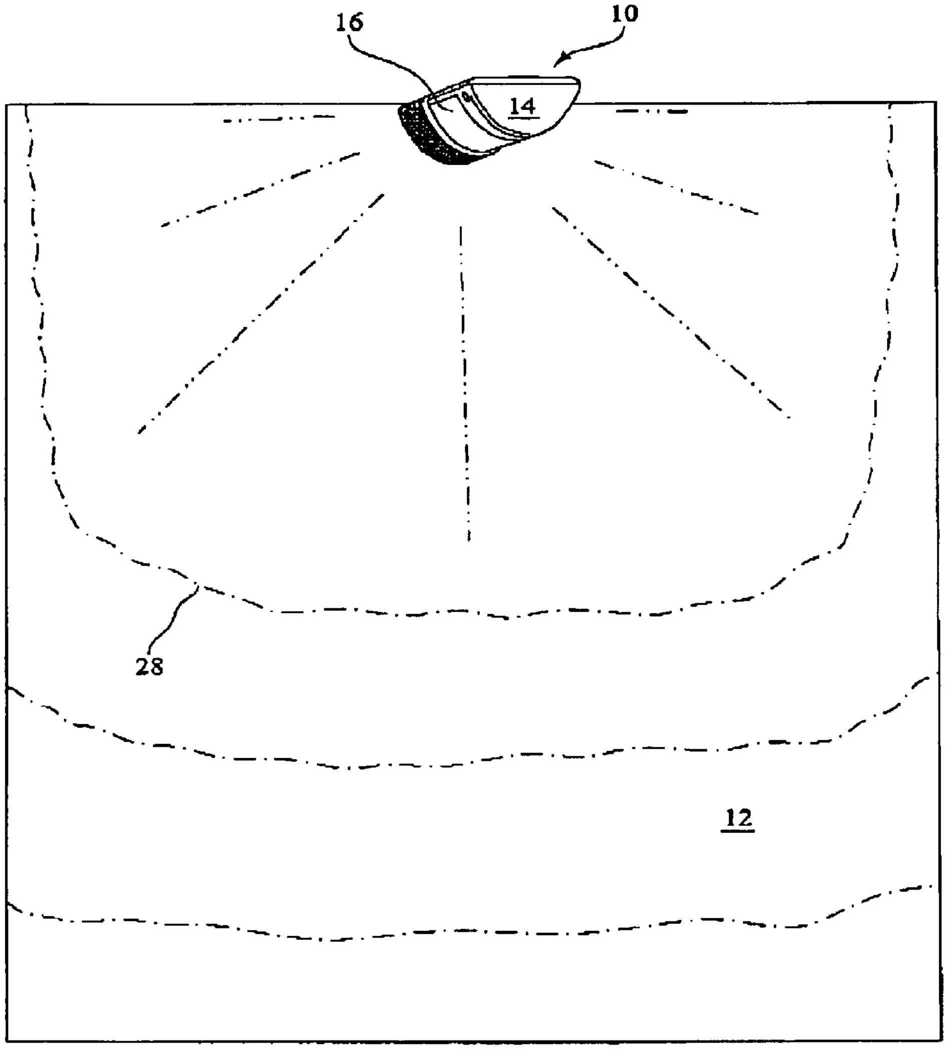
FIG. 2 is an enlarged illustration of a fascia wash luminaire of the present invention mounted to a wall.

FIG. 2 shows a closer view of a fascia wash luminaire 10 positioned on a wall 12. Visible in FIG. 2 are the luminaire housing 14 and a refractor lens 16.

Additional views of the fascia wash luminaire 10 are shown in FIGS. 3 through 5 and FIG. 12, which illustrate that the housing 14 and the refractor lens 16 are trough shaped. The refractor lens 16 is located on the underside of the housing 14.

More specifically, the housing 14 of the embodiment shown has a back wall 38, a top wall 40, and a door frame 42. The back wall 38 has a top edge 44. The top wall 40 extends outward from the top edge 44 of the back wall. The door frame 42, is trough shaped and has an open proximate end 46, a closed distal end 48, and a refractor lens receiving opening 50. The door frame 42 of the shown embodiment is attached to the back wall with a hinge 52, and secured to the to wall 40 with fasteners 54.

Thus, the housing 14 and refractor lens form an enclosure having a lamp cavity.

In the embodiment shown, the refractor lens 16 seals to the door frame 42 to exclude moisture, dust, insects and other pollutants from the lamp cavity of the luminaire 10. The fasteners 54 and hinge 52 allow the door frame 42 to be easily opened for changing the lamp or maintenance of the interior components of the luminaire 10.

Additionally, the embodiment shown in FIGS. 3 through 5 has integral cooling ribs 18 to dissipate heat from the electrical components of the luminaire 10.

Figure 6:
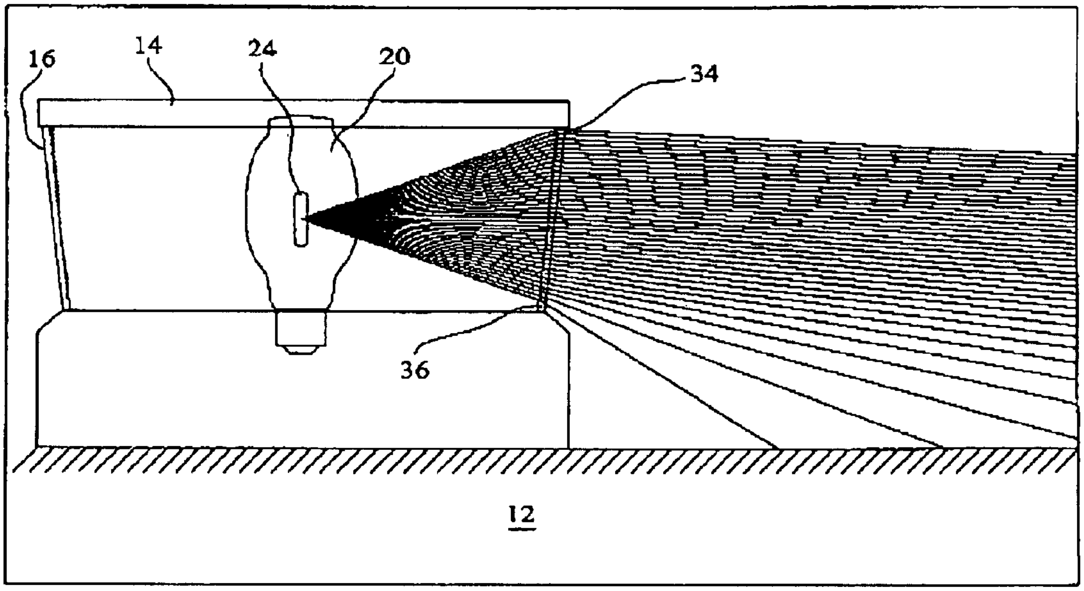
FIG. 6 is a top sectional view taken through line 6—6 of FIG. 5, incorporating a ray traced pattern.
Figure 9:
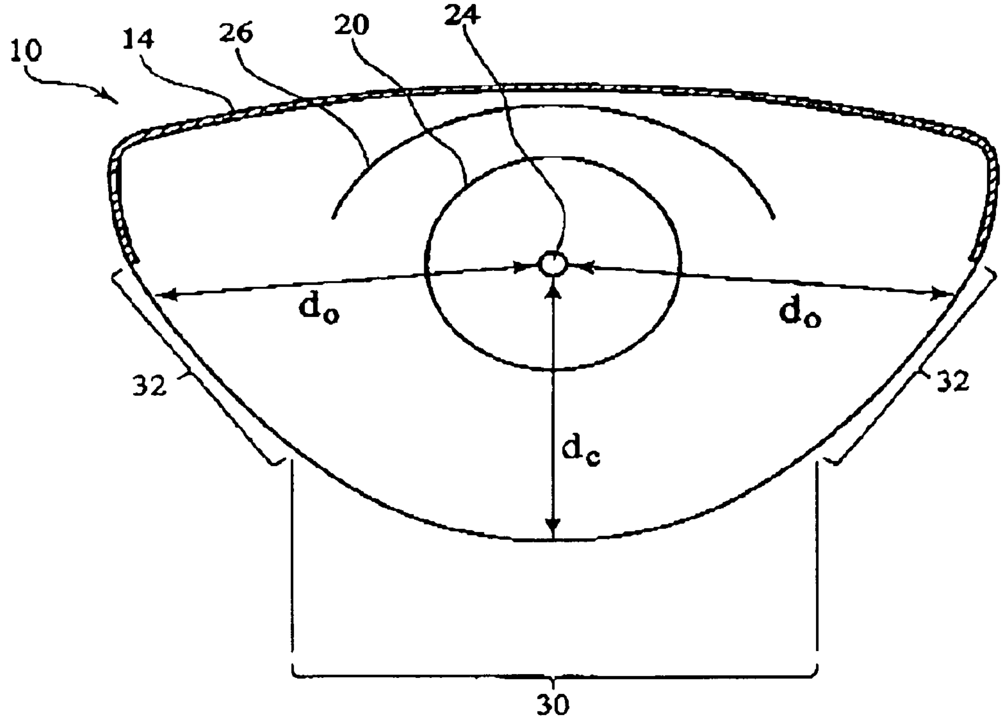
FIG. 9 is a front sectional view taken through line 9—9 of FIG. 3.
Figure 11:
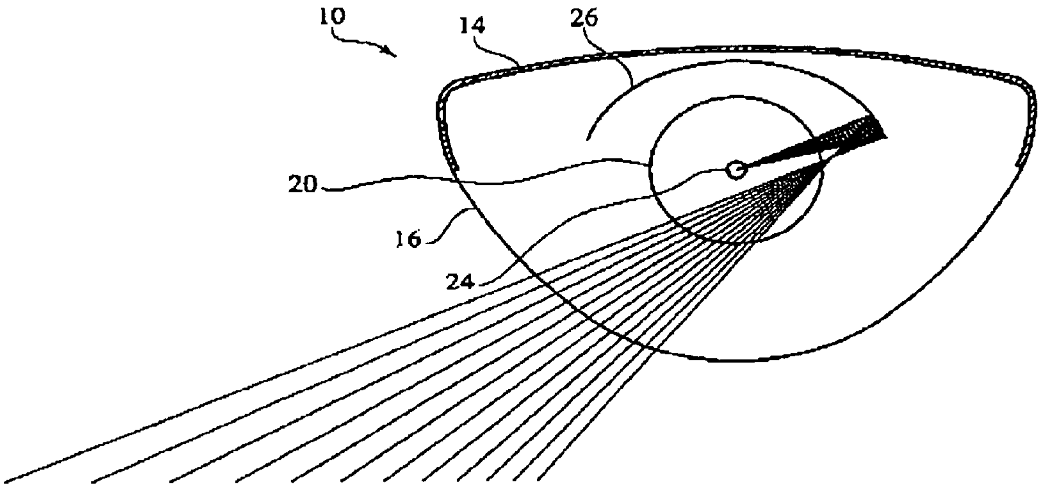
FIG. 11 is a variation on the view of FIG. 10 showing an additional ray traced pattern.
Figure 12:
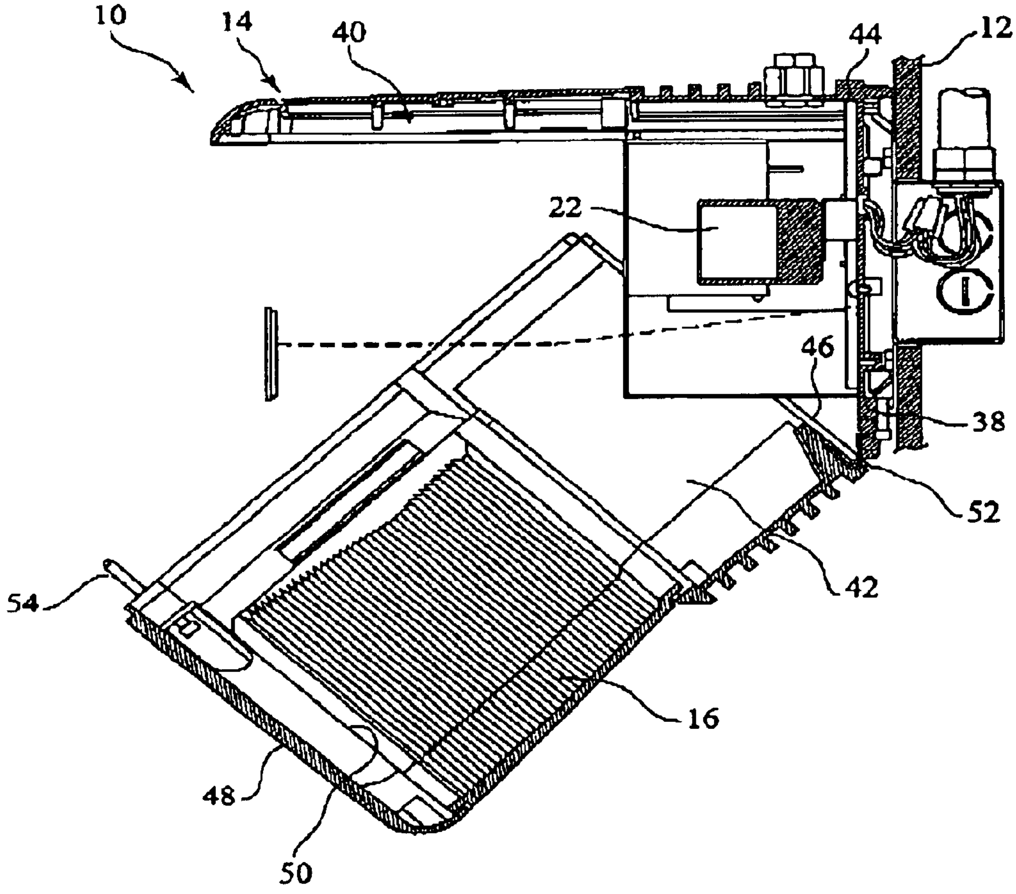
FIG. 12 is a side sectional view of the luminaire with the housing partially opened.

As seen in FIGS. 6 and 9, a lamp 20, and thus the light generation region 24 of the lamp, is positioned within the housing 14 by a lamp socket 22 (shown in FIG. 11). Thus, the lamp socket defines the location of the light generation region 24 of the lamp 20 within the luminaire optical system. The lamp socket 22 is operatively connected to supply of power to a lamp in a well known manner, which is dependent on the lamp to be utilized in the luminaire.

The lamp 20 of the embodiment shown is an arc type lamp having an arc tube which forms a light generation region 24 which has a linear shape oriented along the axis of the lamp 20. It should be noted that the principles of the invention taught and claimed herein will apply equally to other lamp types, such as compact fluorescent or spherical shaped incandescent lamps.

Figure 7:
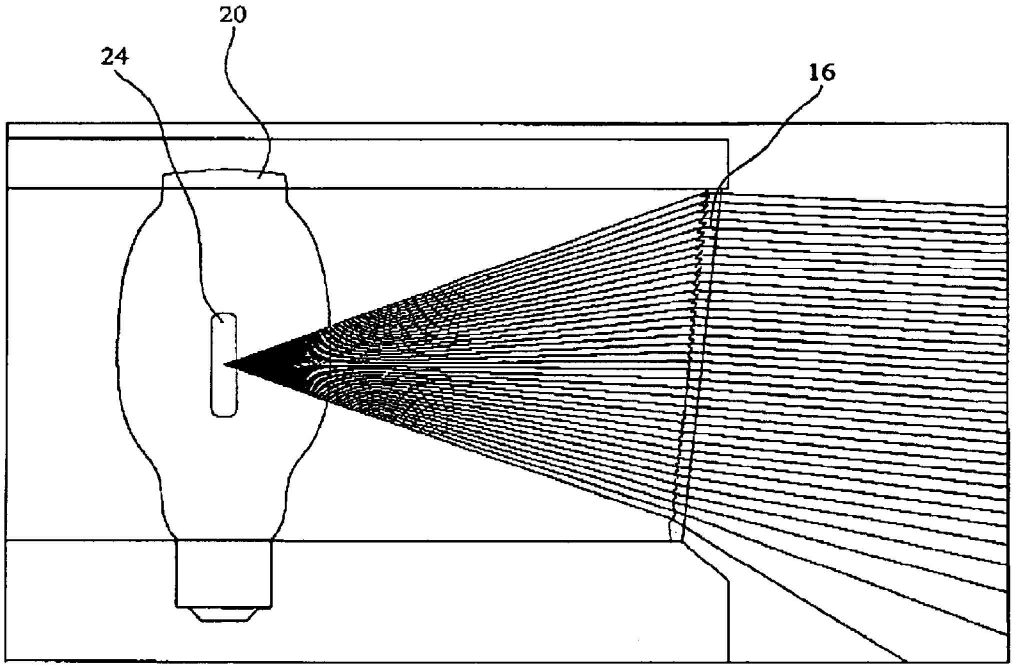
FIG. 7 is a partial enlarged view of FIG. 6.
Figure 8:
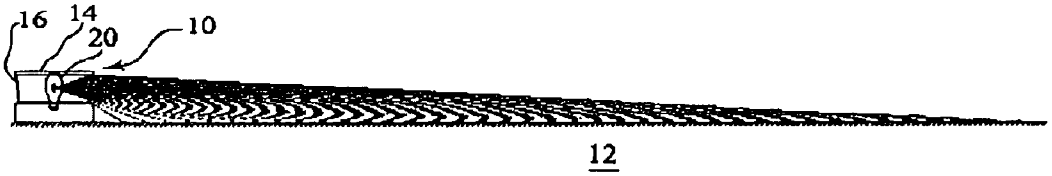
FIG. 8 is a reduced view of FIG. 6 showing the full extent of the illumination pattern.

As shown in FIGS. 7 and 8, the refractor lens 16 focuses or directs substantially all of the illumination from the light generation region 24 toward the wall 12 at a slight angle to the wall. The ray trace diagrams show that the rays are focused substantially parallel to one another. Thus, the light output from the luminaire 10 provides even illumination of the wall 12, and keeps the light from the luminaire 10 on the wall and not on the areas adjacent to the wall. The refractor lens 16 shown is a Fresnel type prismatic lens.

Returning now to the view of FIG. 9, it is seen that the front sectional profile of the refractor lens 16 is non-circular such that the distance between the refractor lens 16 and the light generation region 24 is smaller directly under the light generation region 24 than it is on either side of the light generation region 24. Thus, as shown, the front sectional profile of the refractor lens 16 has a substantially parabolic shape. This shape may be approximated by three or more arc segments arranged as a central arc segment portion 30 and outer arc segment portions 32 on either side of the central arc segment portion 30. Thus, the refractor lens 16 and light generation region 24 are relatively positioned such that the distance between the light generation region 24 and the central arc segment portion 30, $d_c$, is smaller than the distance between the light generation region 24 and each of the outer arc segment portions 32, $d_o$.

Figure 13:
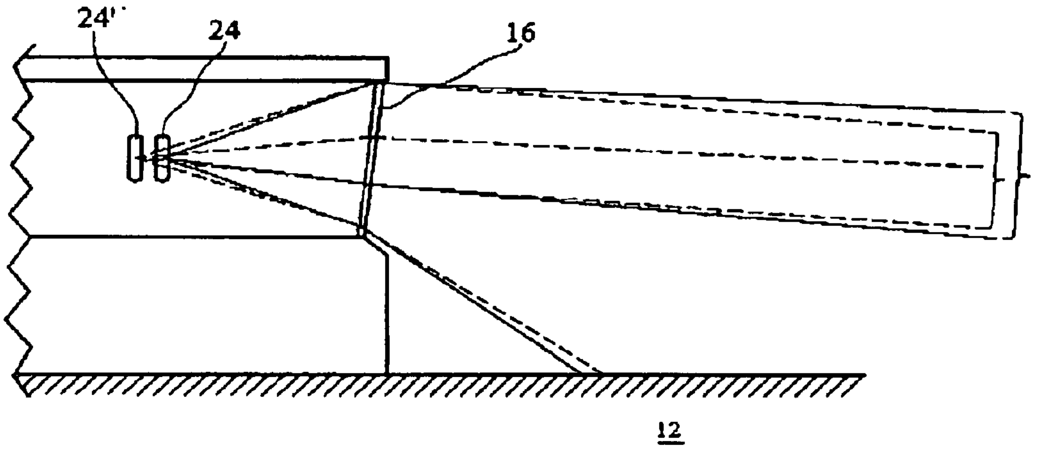
FIG. 13 is ray trace diagram illustrating prism aiming when the light generation region is located at different distances from the lens.

As shown in FIG. 13, the general effect of this arrangement is that the beam becomes concentrated, that is to say it becomes more narrowly focused, as the light generation region 24' is moved further from the refractor lens 16, as shown by the dashed lines in FIG. 13, than the more broadly focused beam produced when the light generation region 24 is located in closer proximity to the lens 16, as shown by the solid lines in FIG. 13. Thus, by utilizing a profile such as the one shown in FIG. 9 where the distance between the refractor lens 16 and the light generation region 24 changes, a tailored beam distribution pattern may be created in order to better illuminate the surface of the wall 12 in different directions. In this manner, the described luminaire will produce a light pattern that is more broadly focused beneath the luminaire 10 and more narrowly focused to the sides of the luminaire 10.

Additionally, in the embodiment shown in FIG. 6, the profile of the refractor lens 16 as taken along a plane through the longitudinal axis of the lamp 20 has a slight inward taper from the distal end 34 of the lens 16 to the end 36 which is proximate to the wall 12. This taper allows light from the light generation region 24 to evenly illuminate areas of the wall 12 close to the luminaire 10, thus preventing 'dead areas' close to the luminaire 10.

Returning now to FIG. 9, the luminaire 10 also utilizes a trough shaped reflector 26 positioned over the light generation region 24 for reflecting light collected from the top side of the light generation region 24 into the desired areas predominately beneath the luminaire 10 and partially diagonal to the luminaire 10. Thus, in the embodiment shown, the reflector 26 has a predetermined contour comprised of a series of parabolic sections every 2½ degrees or so with each section reflecting light from the light generation region 24 in the desired direction. As shown and described, the vertical section profile of the reflector 26 is also non-circular.

Figure 10:
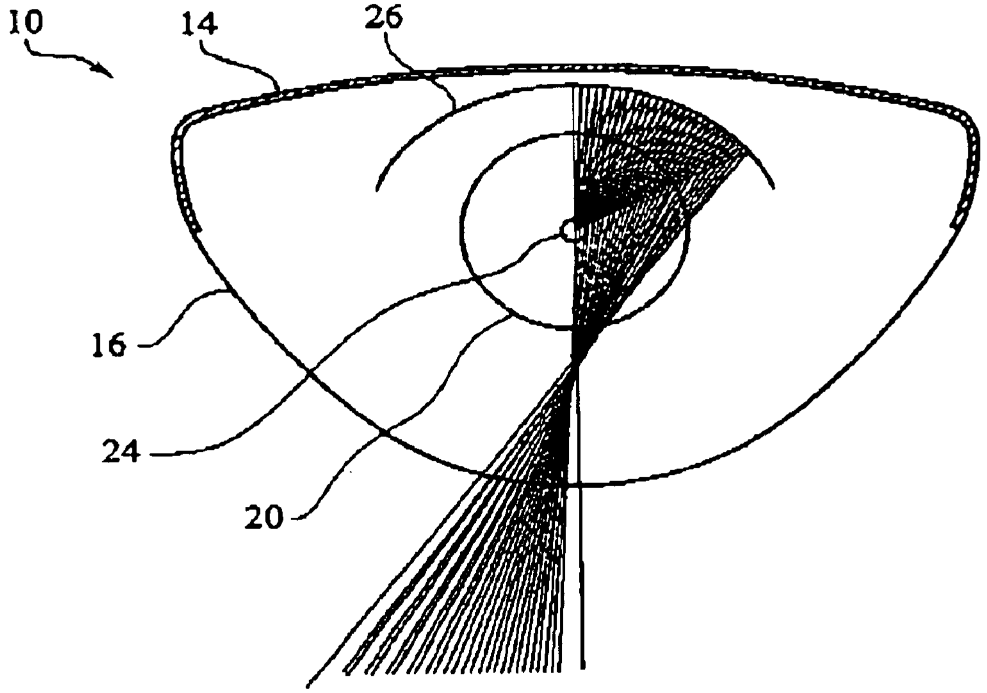
FIG. 10 is a ray trace diagram superimposed on the sectional view of FIG. 9.

Thus, as shown in FIGS. 10 and 11, a majority of the reflector 26 is aimed to reflect light out of the luminaire 10 at angles of less than 40 degrees from nadir (or primarily beneath the luminaire as shown in FIG. 10), while a smaller portion of the reflector 26 is aimed to reflect light out of the luminaire 10 at angles between 40 degrees and 70 degrees (toward the areas located diagonal to the luminaire as shown in FIG. 11).

In this manner, the reflector 26 serves to largely boost the amount of light directed downward at angles of less than 40 degrees from nadir, and partially boost the amount of light directed diagonal to the luminaire 10 at angles between 40 degrees and 70 degrees from nadir. Only light coming directly from the light generation region 24 is directed toward the areas to the sides of the luminaire at angles greater than 70 degrees from nadir. Additionally, the top portion of the housing 14 will block light from exiting the luminaire 10 at angles greater than 90 degrees from nadir.

Therefore, as shown in FIG. 2 the refractor lens 16 and reflector 26 cooperate to focus and reflect illumination from the light generation region 24 of the lamp 20 to produce a light pattern 28 on the wall 12 which is primarily beneath the luminaire 10 and slightly to the sides of the luminaire 10 in a substantially rectangular pattern.

This detailed description of the preferred embodiment, including specific angles and dimensions, shall not be construed as a limitation of the following claims, as it will be readily apparent to those skilled in the art that design choices may be made changing the configuration of the luminaire without departing from the spirit or scope of the invention.

What is claimed is:

1. A luminaire comprising:

a housing for mounting to a wall;

a lamp socket within said housing for holding a lamp having a light generation region, said lamp socket thus determining the location of said light generation region; and a trough shaped refractor lens attached to said housing and positioned under said light generation region such that the distance between the lens and the light generation region is smaller directly under the light generation region than it is on either side of the light generation region said refractor lens directing light from the light generation region to said wall more broadly beneath said luminaire and more narrowly to the sides of said luminaire; and wherein said trough shaped refractor lens tapers from its distal end to the end proximate to the wall.

2. An optical system for a luminaire mounted to a planar surface for illuminating said planar surface, said optical system comprising:

a lamp operatively connected within said luminaire, said lamp having a light generation region;

a trough shaped refractor lens having a substantially parabolic front sectional profile, said lens profile having a central arc segment portion and outer arc segment portions on either side of said central are segment portion, said lens positioned longitudinally normal to said planar surface and in proximity to said lamp such that the distance between the light generation region and the lens central segment portion is smaller than the distance between the light generation region and each of the lens outer segment portions, said retractor lens focusing light from said light generation region toward said planar surface; and a reflector positioned behind said lamp and opposed to said refractor lens for reflecting light from said lamp toward said refractor lens;

whereby substantially all illumination from said luminaire in directed to said planar surface.

3. The optical system of claim 2 wherein said refractor lens is a Fresnel type prismatic lens.

4. The optical system of claim 3 wherein said refractor lens further has a distal end and a proximate end with respect to said planar surface, and wherein said refractor lens tapers inward from said distal end to said proximate end.

5. The optical system of claim 4 wherein said reflector is trough shaped.

6. The optical system of claim 5 wherein said reflector has a predetermined cross-sectional contour comprised of a series of parabolic sections said series of parabolic sections being aimed such that a majority of said reflected light is directed toward said refractor lens at angles of less than about 40 degrees from nadir.

7. The optical system of claim 6 wherein a minority of said reflected light is directed toward said refractor lens at angles between about 40 degrees and about 70 degrees from nadir.

8. The optical system of claim 7 wherein said lamp is an arc-type lamp, wherein said light generation region has a linear shape, and wherein said linear light generation region is longitudinally aligned with said refractor lens and said reflector.

9. A fascia wash luminaire for illumination of building fascia, said fascia wash luminaire comprising:

a housing having:

a back wall having a top edge;

a top wall extending outward from said top edge of said back wall;

a trough shaped door frame having an open proximate end, a closed distal end, and a refractor lens receiving opening, said door frame attached to said back wall and said top wall; and whereby said back wall, said top wall, and said trough shaped door frame form a lamp cavity;

a lamp socket operatively connected within said cavity, said lamp socket defining the location of a light generation region of a lamp;

a trough shaped refractor lens having a substantially parabolic front sectional profile, said lens front sectional profile having a central arc segment portion and outer arc segment portions on either side of said central segment portion;

said refractor lens being received within said refractor lens receiving opening of said door frame in longitudinal alignment with said door frame, whereby said refractor lens and said housing form an enclosure;

said lamp socket positioned such that the distance between said light generation region and said central arc segment portion of said refractor lens is smaller than the distance between said light generation region and each of said outer arc segment portions of said refractor lens;

said refractor lens directing substantially all illumination from said lamp toward said building fascia.

10. The fascia wash luminaire of claim 9 further comprising a reflector positioned within said housing cavity opposed to said refractor lens.

11. The fascia wash luminaire of claim 10 wherein said reflector is trough shaped.

12. The fascia wash luminaire of claim 11 wherein said concave shaped reflector has a predetermined cross-sectional contour comprised of a series of parabolic sections, said parabolic sections being oriented such that a majority of said redirected light is redirected at angles of less than about 40 degrees from nadir while the remaining redirected light is redirected at angles between about 40 degrees and about 70 degrees from nadir.

13. The fascia wash luminaire of claim 9 wherein said refractor lens further has a distal end and a proximate end with respect to said back wall of said housing, and wherein said refractor lens tapers inward from said distal end to said proximate end.

14. The fascia wash luminaire of claim 13 wherein said refractor lens is a Fresnel type prismatic lens.

15. The fascia wash luminaire of claim 9 further having a hinge, said hinge attached between said housing back wall and said housing door frame.

16. The fascia wash luminaire of claim 9 further having cooling ribs integral with said housing top wall and said housing trough shaped door frame.

17. A luminaire comprising:

a housing;

a lamp socket within said housing for holding a lamp having a light generation region, said lamp socket thus determining the location of said light generation region; and a trough shaped refractor lens attached to said housing, said refractor lens having a substantially parabolic front section profile, and said lens profile having a central arc segment portion and outer are segment portions on either side of said central arc segment portions;

wherein said refractor lens is positioned longitudinally normal to an installation surface, and the distance between said light generation region and said central arc segment is smaller than the distance between said light generation region and each of said outer segment portions, whereby said refractor lens directs light from said light generation region more broadly beneath said luminaire and more narrowly to the sides of said luminaire.

18. The luminaire of claim 17 wherein said light generation region of said lamp is linear, wherein said lamp socket positions said linear light generation region substantially normal to said installation surface, and wherein said trough shaped refractor lens is longitudinally aligned with said linear light generation region.

19. The luminaire of claim 17 said refractor lens being a Fresnel prismatic lens.

20. The luminaire of claim 17 further comprising a trough shaped reflector positioned over said light generation region opposed to said trough shaped refractor lens for reflecting light collected from the top side of said light generation region through said refractor lens predominantly beneath the luminaire and partially diagonal to the luminaire.

21. The luminaire of claim 20 wherein said trough shaped reflector has a predetermined contour comprised of a series of parabolic sections.

22. The luminaire of claim 21 wherein said series of parabolic sections are spaced every 2½ degrees around said light generation region.

23. The luminaire of claim 21 wherein a majority of said reflector is aimed to reflect light out of the luminaire at angles of less than 40 degrees from nadir and the remainder of the reflector is aimed to reflect light out of the luminaire at angles between 40 degrees and 70 degrees from nadir.

24. A luminaire, comprising:

a housing;

a lamp socket within said housing for holding a horizontal lamp having a light generation region, said light generation region horizontally linear to said lamp socket;

a trough shaped reflector positioned longitudinally normal to said lamp socket, positioned over said light generation region, and longitudinally aligned with said light generation region, said trough shaped reflector having a predetermined contour comprised of a series of parabolic sections; and, a trough shaped refractor lens attached to said housing, opposed to said reflector, and longitudinally aligned with said light generation region, said refractor lens having a substantially parabolic front section profile, and said lens profile having a central arc segment portion and outer arc segment portions on either side of said central arc segment portions;

wherein said refractor lens is positioned longitudinally normal to said lamp socket, and the distance between said tight generation region and said central arc segment is smaller than the distance between said light generation region and each of said outer segment portions, whereby said refractor lens directs light from said light generation more broadly beneath said luminaire and more narrowly to the sides of said luminaire.

* * * * *